United States Patent
Artiuch et al.

(10) Patent No.: US 11,294,406 B2
(45) Date of Patent: Apr. 5, 2022

(54) DETERMINING DIAPHRAGM LIFE ON A PRESSURE REGULATOR

(71) Applicant: Natural Gas Solutions North America, LLC, Houston, TX (US)

(72) Inventors: Roman Leon Artiuch, Houston, TX (US); Jeff Thomas Martin, Spring, TX (US)

(73) Assignee: Natural Gas Solutions North America, LLC

( * ) Notice: Subject to any disclaimer, the term of this patent is extended or adjusted under 35 U.S.C. 154(b) by 0 days.

(21) Appl. No.: 16/121,695

(22) Filed: Sep. 5, 2018

(65) Prior Publication Data

US 2020/0073418 A1 Mar. 5, 2020

(51) Int. Cl.
  *G05D 16/06* (2006.01)
  *G05B 23/02* (2006.01)

(52) U.S. Cl.
  CPC ..... *G05D 16/0683* (2013.01); *G05B 23/0205* (2013.01); *G05D 16/0661* (2013.01)

(58) Field of Classification Search
  CPC ........... G05D 16/0683; G05D 16/0661; G05D 16/063; G05D 16/0652; G05D 16/10; G05D 16/185; G05D 16/2013; G05D 16/2066; G05B 23/0205; G05B 2219/33326; G05B 2219/37351; G05B 2219/37432; G05B 2219/37534; G05B 2219/45006; G05B 23/0235; F16K 37/0083; F16K 7/126; F16K 31/1262; F16K 31/1266; F16K 31/402; F16K 37/0033; F16K 37/0041; F16K 7/12; F16K 7/17; G01D 5/24; G01D 5/202; G01D 5/2417; F01P 2007/146; F01P 2025/30; F01P 2025/32; F01P 2070/10; F01P 7/14; F01P 7/16; F01P 7/167; F04B 2205/01; F04B 49/20; F15B 11/028;
(Continued)

(56) References Cited

U.S. PATENT DOCUMENTS 5,261,382 A * 11/1993 Nikolai ............... F02D 41/1473
                                                          123/488
6,056,008 A     5/2000 Adams et al.
(Continued)

FOREIGN PATENT DOCUMENTS

GB  2143330 A     2/1985
JP  2006190118 A  * 7/2006
JP  2006190118 A    7/2006

OTHER PUBLICATIONS

European Search Report dated Feb. 12, 2020, issued by the European Patent Office in corresponding EP19195515.2.

*Primary Examiner* — Nimeshkumar D Patel
*Assistant Examiner* — Gedeon M Kidanu
(74) *Attorney, Agent, or Firm* — Paul Frank + Collins P.C.

(57) ABSTRACT

Apparatus are configured to monitor lifespan of parts on a pressure regulator. These configurations may include sensors that generate signals in response to movement of parts on the pressure regulator. Processing circuitry can process the signals to identify data that corresponds to deflection of a spring inside of the pressure regulator. This data may correlate with duty cycle of a diaphragm. In one implementation, utilities can use the duty cycle to gauge useable lifespan of the diaphragm as well as other operating conditions that may prevail on the pressure regulator.

7 Claims, 5 Drawing Sheets

(58) Field of Classification Search
CPC .... F15B 2211/30525; F15B 2211/3111; F15B 2211/31576; F15B 2211/327; F15B 2211/50554; F15B 2211/5151; F15B 2211/526; F15B 2211/565; F15B 2211/6309; F15B 2211/6653; F16F 15/027; F23K 2400/201; F23K 5/007; F23N 2005/185; F23N 5/16; F23N 5/184; G01F 1/3227; G01F 1/36; G01F 1/42; G01F 1/66; G01F 1/76; G01F 1/78; G01F 1/88; G01L 27/002; G01L 27/007; G01L 9/0072; G01L 9/0075; G01N 29/38; G01N 29/4427; H01H 35/26; H03B 5/08; Y10T 137/7825; Y10T 137/8242; Y10T 137/8326

See application file for complete search history.

(56) References Cited

U.S. PATENT DOCUMENTS

| | | | |
|---|---|---|---|
| 6,167,905 B1 | 1/2001 | Malloy et al. | |
| 6,237,624 B1 * | 5/2001 | Neumair | F15B 11/028 137/505.41 |
| 6,761,063 B2 * | 7/2004 | Mengle | F16K 7/126 73/168 |
| 10,060,328 B2 * | 8/2018 | de Andrade Filho | F16K 37/0033 |
| 2001/0028849 A1 * | 10/2001 | Aguirre | G05D 16/2066 417/42 |
| 2006/0065307 A1 | 3/2006 | Schmidt et al. | |
| 2007/0177998 A1 * | 8/2007 | Kato | F04B 7/02 417/395 |
| 2008/0230128 A1 * | 9/2008 | Smith | B05B 12/088 137/505 |
| 2008/0257418 A1 | 10/2008 | Kranz et al. | |
| 2010/0030386 A1 * | 2/2010 | Kawashima | G05D 16/2013 700/282 |
| 2011/0282596 A1 * | 11/2011 | Patel | F23K 5/007 702/48 |
| 2014/0005960 A1 * | 1/2014 | Anderson | F16K 37/0083 702/56 |
| 2014/0203198 A1 * | 7/2014 | Jennings | G05D 16/024 251/61.1 |
| 2015/0107369 A1 * | 4/2015 | Downie | G01F 1/78 73/861.19 |
| 2015/0369393 A1 * | 12/2015 | Picht | F16K 37/0083 73/1.72 |
| 2016/0041538 A1 | 2/2016 | Kemp et al. | |
| 2016/0265945 A1 * | 9/2016 | Murakami | G01D 5/202 |
| 2016/0282213 A1 * | 9/2016 | Tochigi | G01L 27/007 |
| 2016/0341330 A1 * | 11/2016 | Sneh | F16K 7/16 |
| 2017/0199530 A1 * | 7/2017 | Young | G05D 16/2095 |

* cited by examiner

DETERMINING DIAPHRAGM LIFE ON A PRESSURE REGULATOR

BACKGROUND

Utility companies deliver a wide range of resources to customers. These resources include fuel gas that customers may use for heat, hot water, and cooking. It is normal for the utility to install its own equipment on site to measure consumption of the fuel gas. This equipment often includes a gas meter and a pressure regulator that work together to determine an amount of fuel gas the customer uses (so the utility can provide an accurate bill). In jurisdictions for most customers, a Public Utility Commissions (PUC) promulgates rules to regulate the "metering" equipment. These rules often mandate safety procedures or instructions to avoid accidents that can lead to damage or loss of life. Some of these procedures may require the utility to perform regular maintenance on the metering equipment, including that the utility replace certain parts after expiration of a set service life. However, the "actual" service life depends greatly on demand for fuel gas. And demand may vary greatly from customer to customer. Commercial kitchens and bakeries, for example, have different demands for fuel gas than apartment buildings or residential homes. These variations result in significantly different stress on the metering equipment that can cause parts that service "lower" demand customers to still have significant life left well beyond the service life set in the rules of the PUC. Nonetheless, the PUC rules obligate the utility to incur costs of parts and labor to perform requisite maintenance (or "truck trip") to timely service the equipment independent of actual service life or reasonable expectations of demand at the customer.

SUMMARY

The subject matter disclosed herein relates to improvements that can help utilities avoid these unnecessary truck trips. Of particular interest are embodiments that can provide an accurate account of useable life for parts inside of the pressure regulator. These embodiments are not invasive, either, so as to maintain as valid (or not void) any factory or manufacture warranty on the device.

DRAWINGS

Reference is now made briefly to the accompanying drawings, in which.

Figure 1:
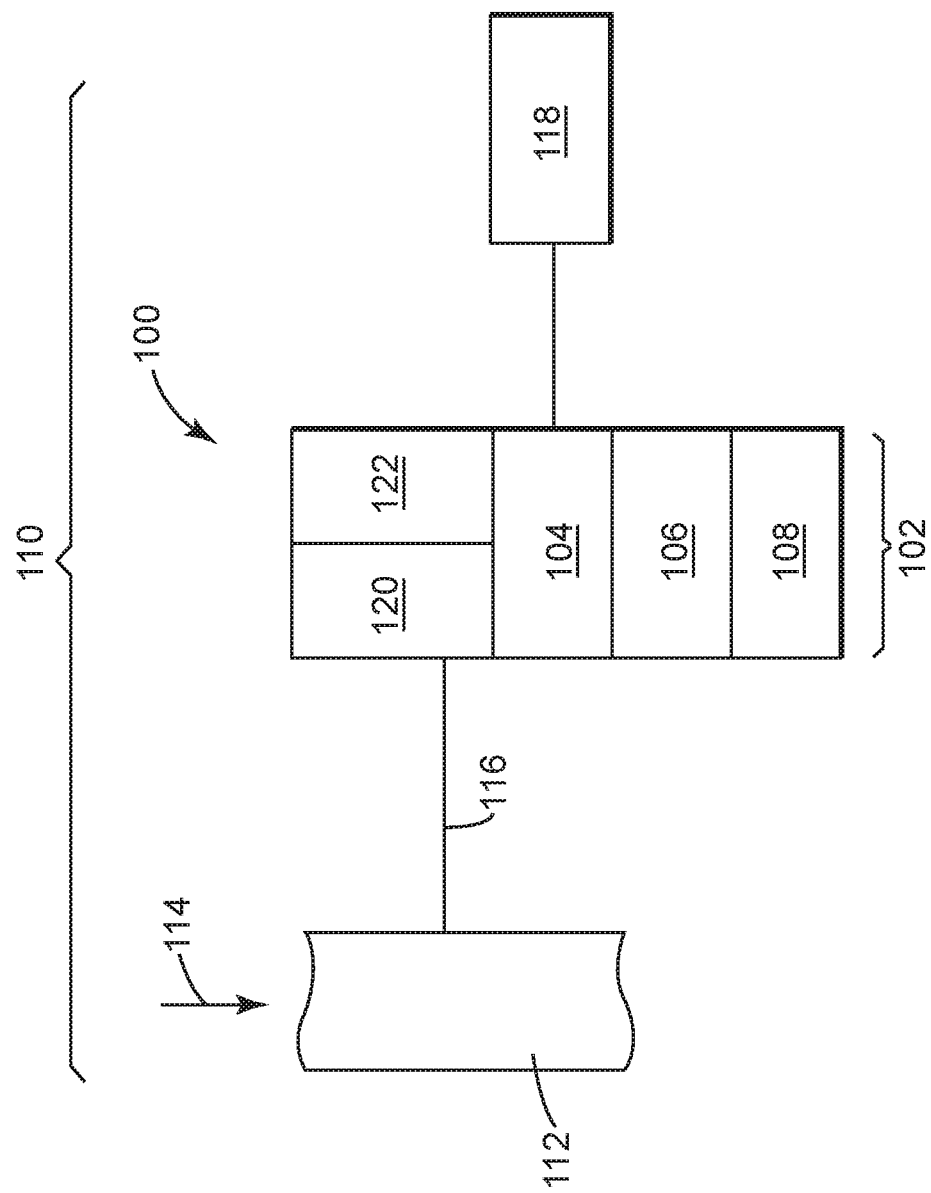
FIG. 1 depicts a schematic diagram of an exemplary embodiment of a monitor unit that may monitor performance of a pressure regulator.

Where applicable, like reference characters designate identical or corresponding components and units throughout the several views, which are not to scale unless otherwise indicated. The embodiments disclosed herein may include elements that appear in one or more of the several views or in combinations of the several views. Moreover, methods are exemplary only and may be modified by, for example, reordering, adding, removing, and/or altering the individual stages.

DETAILED DESCRIPTION

The discussion below highlights embodiments that can improve device diagnostics for pressure regulators in the field. These embodiments can monitor internal part movement to arrive at accurate duty cycles, particularly for the diaphragm, which is often subject to strict replacement guidelines and regulations. Utilities can use this information to provide better foresight as to "actual" useable life of the diaphragm. In this way, these companies can avoid unnecessary service maintenance to replace still-good diaphragms, or other parts, from the pressure regulators, thus saving cost in time and labor that might be better allocated elsewhere.

FIG. 1 depicts a schematic diagram of an exemplary embodiment of a monitor unit 100. This embodiment is shown as part of a metering unit 102 that measures volumetric flow of fluids (e.g., gasses and liquids). The metering unit 102 may include one or more metering components (e.g., a gas meter 104, a pressure regulator 106, and a shut-off valve 108). The components 104, 106, 108 are often part of a distribution network, identified generally by the numeral 110. The distribution network 110 may include a conduit 112 or "service line" that carries material 114, which for purposes here is fuel gas. The metering unit 102 may interpose on a branch line 116 between the service line 112 and a customer 118. As also shown, the monitor unit 100 may include a sensor unit 120 and a processing unit 122 that work in combination to generate signals and data that correspond with operation of the metering unit 102.

Broadly, the monitor unit 100 may be configured to facilitate diagnostics on the metering unit 102. These configurations may generate signals and data to characterize operating conditions on the components 104, 106, 108. In one implementation, the signals and data correspond with movement of parts on the pressure regulator 106. The monitor unit 100 may use the signals and data to accurately quantify duty cycle, identify problematic operating conditions, or forecast potential maintenance needs for this device. Utilities may find these features helpful to avoid unnecessary "truck trips" to replace parts that remain free of defects or have reasonable useable life left for them to continue to operate safely in the field.

The metering unit 102 may be configured to accurately measure consumption of flowing fluids. These configurations often reside outside of commercial, industrial, and residential buildings. Data from the metering units 102 may correspond to volumetric flow through the gas meter 104. Utilities use this data to accurately bill customers for their consumption of resources.

The gas meter 104 may be configured to measure or "meter" flow of gas to quantify demand at the customer 118. These configurations may include mechanics or electronics that can generate values for volumetric flow of the fuel gas that passes through the device. Exemplary mechanics may include mechanism with counter-rotating impellers or diaphragms. These mechanisms may move in response to flow through the device. The movement coincides with precise volumes of gas. Electronics on the gas meter 104 may convert the movement into values for volumetric flow, often taking into account (or "correcting" for) variations in ambient temperature or pressure to ensure accurate and reliable values for billing the customer 118. In some implementation, the gas meter may employ sensors (e.g., pressure sensors) in lieu of any mechanisms to measure and quantify values for volumetric flow.

The pressure regulator 106 may be configured to maintain a defined pressure of fuel gas in the metering unit 102. These configurations often include a self-contained, cast body that encloses a spring, a flexible diaphragm, and a valve. Manufacturers often provide a "seal" or indicator on the body to deter access inside of the device. In operation, the flexible diaphragm displaces in response to changes in downstream pressure. Movement of the diaphragm in this manner opens or closes the valve to equalize pressure from inlet to outlet. It also causes the spring to compress (or relax). Movement of the spring correlates well with duty cycle of the diaphragm over the life of the pressure regulator 106 as part of the metering unit 102.

The shut-off valve 108 may be configured to prevent flow through the metering unit 102. These configurations may embody devices like a ball or butterfly valve found upstream of the pressure regulator 106 in the branch line 116. The valves may require an end user (e.g., a technician) to manually manipulate an actuator to regulate flow to the pressure regulator 106. Use of the monitor unit 100, however, may operate the actuator automatedly, for example, to close the valve in response to operating issues detected during operation in the field. The end user may manually open the valve once the issue is cleared.

The distribution network 110 may be configured to distribute gas 114 and other resources. These configurations may employ intricate networks of piping 112, 116 that cover vast areas of towns or cities with hundreds or thousands customers 118. In most cases, utilities maintain responsibility for upkeep, maintenance, and repair of the metering unit 102. This mandate requires, at least, mandatory maintenance to replace parts or to perform other work as necessary. The monitor unit 100 may alleviate some costs and labor of this maintenance, however, because it provides diagnostics to reasonably estimate part use or duty cycle that are useful to frame overall health of the metering unit 102.

The sensor unit 120 may be configured to generate signals in response to movement on the metering unit 102. These configurations may embody devices (or "sensors") to monitor or target specific parts or areas, for example, the spring on the pressure regulator 106. Sensors may include accelerometers that employ piezoelectric, piezoresistive, or capacitive components, although other constructs may work as well. Generally, the concepts here may prefer sensors that can detect movement inside of the pressure regulator 106 without the need to open or access any parts inside of the self-contained body. This feature is favorable for utilities to adopt the monitor unit 100 because it does not require violation of the "seal" that could void any manufacturer warranties or liabilities of the pressure regulator 106. However, this disclosure does contemplate implementations that incorporate sensors, either partly or wholly, within the self-contained, cast body of the pressure regulator 106.

The processing unit 122 may be configured to process signals from the sensor unit 120. These configurations may embody circuitry to generate signals and data, for example, signals and data that quantify parameters for the spring in the pressure regulator 106. Exemplary parameters may define deflection of the spring that occurs collateral to movement of the diaphragm in response to changes in downstream demand for fuel gas at the customer 118.

Figure 2:
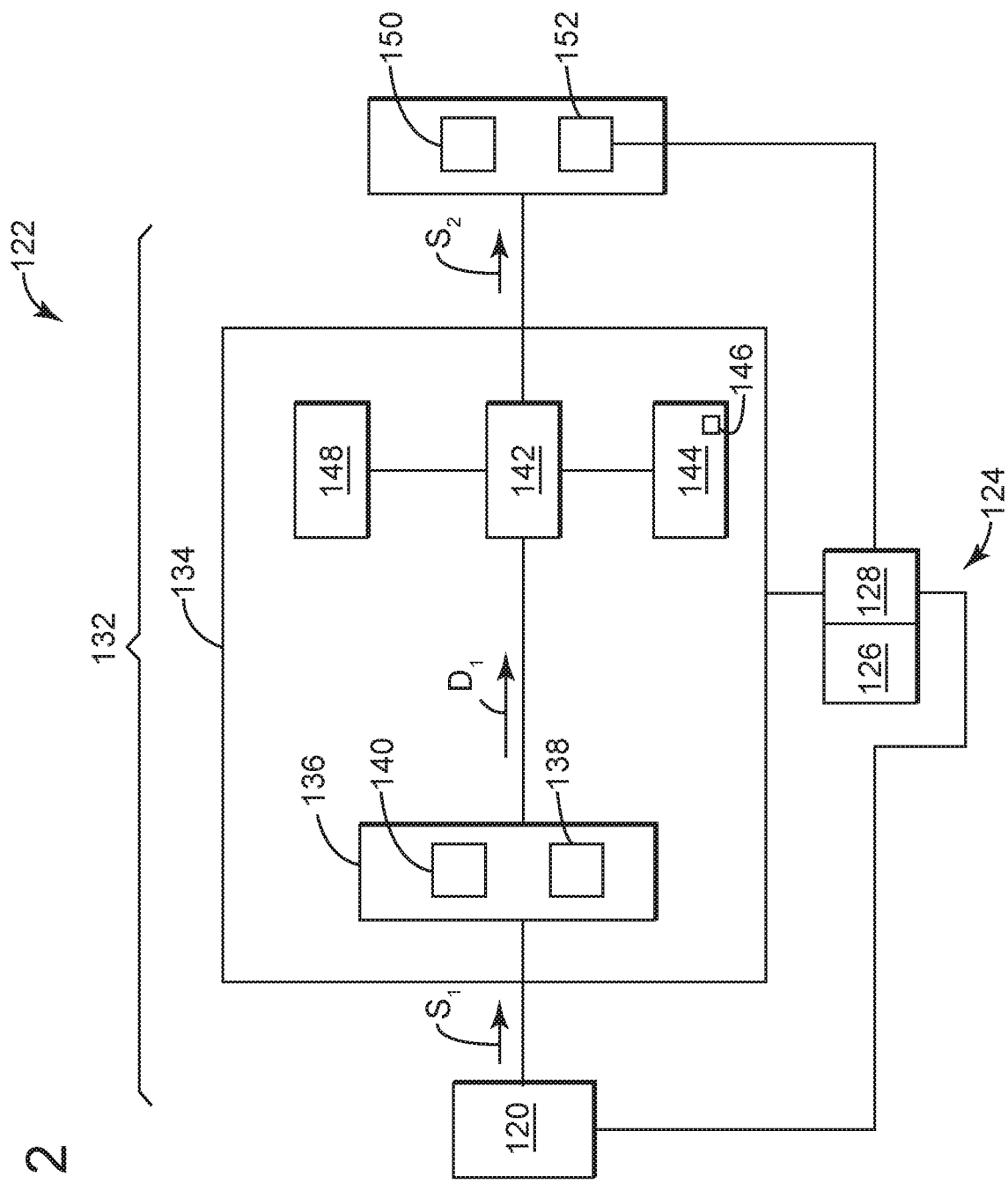
FIG. 2 depicts a schematic diagram of exemplary topology for circuitry for the monitor unit of FIG. 1.

FIG. 2 depicts a schematic diagrams with details for exemplary topology of circuitry of the processing unit 122. This circuitry may include a power unit 124 with a battery 126 (or, generally, a localized energy storage). The power unit 124 may also include power management components 128 to manage power to the sensor unit 120 and to data processing components 132. Moving from left to right in the diagram, the data processing components 132 may include a signal processor 134 with a signal converter 136 that receives and converts an incoming signal $S_1$ (from the sensor unit 120) to a digital signal $D_1$. The incoming signal $S_1$ may embody a time-based signal in analog format, for example, from an accelerometer on the pressure regulator 106. In such case, the signal converter 136 may benefit from an analog-to-digital converter 138 to format the digital signal $D_1$. A filter 140 may help to remove unwanted noise (or components or features) from the incoming signal $S_1$ that might frustrate signal processing functions downstream. Noise may include spurious vibration (or movement) that is not a result of mechanics or mechanical activity on the pressure regulator 106. The spurious vibration may occur due to truck or vehicle traffic proximate the metering unit 102. The filter 140 may include analog and digital filters, as desired. In one implementation, the filter 140 may benefit from a band gap or band value that defines either inclusion or exclusion of values to better filter the noise from the incoming signal $S_1$.

As also shown, the components 132 may include computing components that operate on or in response to the digital signal $D_1$. These computing components may include a processor 142 that couples with memory 144 with executable instructions 146 stored thereon. A timing circuit 148 may also be included as a real-time clock. The timing circuit 148 may embody a micro-power chip with an oscillator that counts time. The chip may couple with its own power supply, often a lithium battery with extensive lifespan (e.g., >2 years). A counter may couple with the oscillator. The counter processes signals from the oscillator to output time increments, preferably at accuracy that comports with national standard clocks. One or more of the components 142, 144, 148 may integrate together as a micro-controller or like integrated processing device with memory and processing functionality. In operation, executable instructions 146 may configure the processor 142 with functionality to process the time-based digital signal $D_1$ to generate an outgoing signal S2, preferably a frequency-based signal in digital format. In one implementation, functionality may use Fast Fourier Transform (FFT) for this purpose; however, this disclosure contemplates use of other signal processing techniques, like heterodyne principle and phase-locked loop, among others. For some applications, the frequency-based digital signal S2 may encode data that corresponds with spring stroke frequency or an aggregate number of spring strokes over a period of time, among others.

The components 132 may also include components to exchange data with other devices. These components may include one or more data exchange devices, shown and identified here as one or more connector(s) 150 and one or more wireless device(s) 152. Generally, devices 150, 152 can receive and transmit (or broadcast) data. This feature is useful to exchange data with, for example, the gas meter 104 or another device remote from the monitor unit 100 or metering device 102. Remote devices may include handheld implements, for example, meter readers or computing devices like smart phones, tablets, or laptops. The connector(s) 150 may outfit the monitor unit 100 to receive cable or terminal end, as might be used for Ethernet, broadband, or similar wired connections. For wireless transmission, the wireless device(s) 152 may include one or more antennas, radios, or other hardware that may provide shortrange wireless connectivity consistent with data protocols or formats for near-field communication (NFC), Bluetooth®, or Zigbee®. The hardware may also comport with longer range wireless connectivity to exchange data over longer distances using data protocols or formats for cellular or WiFi.

Figure 3:
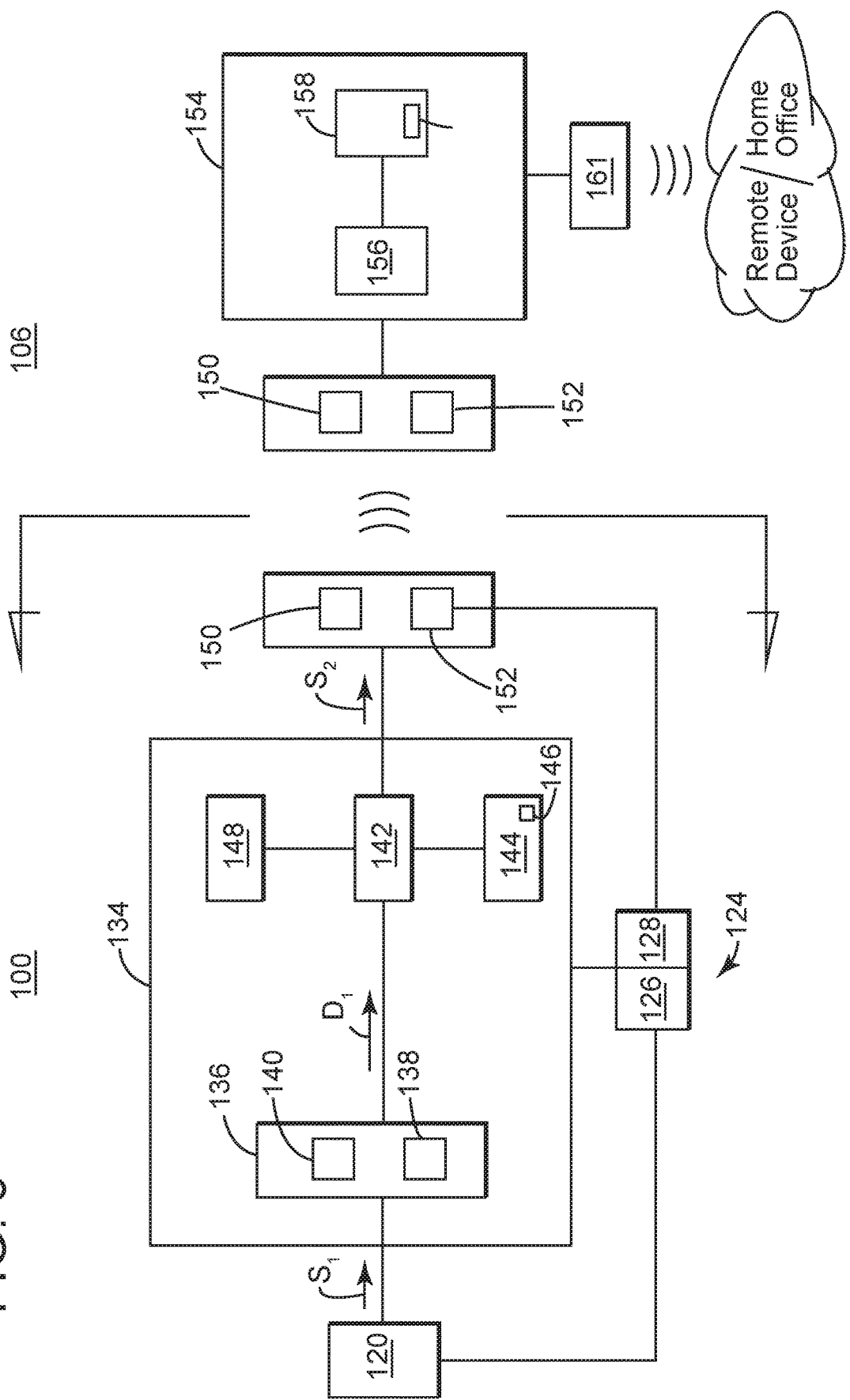
FIG. 3 depicts a schematic diagram of exemplary topology for circuitry for the gas meter that can interface with the monitor unit of FIG. 1.

FIG. 3 depicts a schematic diagram to inform the discussion about use of the monitor unit 100 of FIG. 1 to monitor operating conditions on the metering unit 102. The gas meter 104 may also include corresponding devices 150, 152 to exchange data with the monitor unit 100. This hardware may integrate with a master board 154 that has computing components like a processor 156 and memory 158 with executable instructions 160 stored thereon. The components 156, 158 may integrate together to form a micro-processor or like integrated circuit device. In one implementation, the master board 154 may integrate with a communication board 161 with devices (e.g., antenna, radios) to facilitate data exchange from the gas meter 104 to, for example, a home office or data repository for the utility.

Generally, the master board 154 can be configured to operate as the "brains" for the gas meter 104. These configurations may have computing resources (and power resources) sufficient to perform analytics, diagnostics, and other data manipulations (including on or with spring stroke data from the monitor unit 100). For example, the executable instructions 160 may configure the processor 156 for functionality to perform diagnostics with the frequency-based stroke data. This functionality may operate on the spring stroke data to generate data that qualifies or quantifies operating life, duty cycle, or other parameters that may prove useful for diagnostics on the pressure regulator 106 and its parts, like the diaphragm. In one implementation, functionality may compare the aggregate number of spring strokes to a threshold value, for example, service life limits set by the manufacturer or the PUC. The relationship between the aggregate number and the threshold value may indicate that maintenance needs to occur on the pressure regulator 106. If the aggregate number meets or exceeds the threshold value, functionality may generate an output that indicates the diaphragm is at its end-of-life (or in need of maintenance). The metering unit 102 may benefit from functionality that generates an indicator in response to this output, like an alert that is audible or visible. The output may afford the metering unit 102 with a fail-safe mechanism to avoid unsafe operating conditions. For example, the output to cause the shut-off valve 108 to close to prevent flow of gas (to the customer 118). In one implementations, the gas meter 104 may also transmit the output to the utility, for example, as part of scheduled data exchange with a meter reader. However, it may benefit the utility for the gas meter 104 to automatically transmit the output in response to end-of-life and maintenance issues. This feature may allow utilities to monitor metrics for the pressure regulator 106 to more accurately and cost-effectively schedule maintenance of the device.

The executable instructions 160 may also provide other functionality that generates outputs to improve functions on the metering unit 102. Some functionality may leverage other gas metering data from the gas meter 104, like volumetric flow and pressure. This gas metering data correlates with demand at the customer 118 and, thus, may serve to predict spring movement on the pressure regulator 106 as well. In one implementation, functionality may set the band gap or the band value for the filter 140 to correlate with the gas metering data. Other functionality may compare the spring stroke data to the gas metering data to identify improper set-up of the pressure regulator 106, for example, if the spring stroke data shows that the diaphragm moves (e.g., to open and close the valve) in a manner that does not correlate with the changes in demand at the customer 118.

The executable instructions 160 may also provide functionality for a learning mode. Generally, functionality for the learning mode may analyze data over time to predict operating conditions on the pressure regulator 106. This analysis may, for example, correlate customer demand to predict or base-line movement of the diaphragm (and spring) in the pressure regulator 106. In another example, functionality of the learning mode may learn a pattern of movement of the spring from the spring stroke data. Functionality may, in turn, compare the pattern to gas metering data to correlate the pattern of movement of the spring with one or both of volumetric flow rate and pressure of the fuel gas. In one implementation, if the pattern deviates from the gas metering data, functionality may identify the operating condition or, at least, a change in the operating conditions on the pressure regulator and, in turn, set an alarm or provide some other indicator to the utility to cause more thorough analysis or maintenance to occur on the pressure regulator 106.

Figure 4:
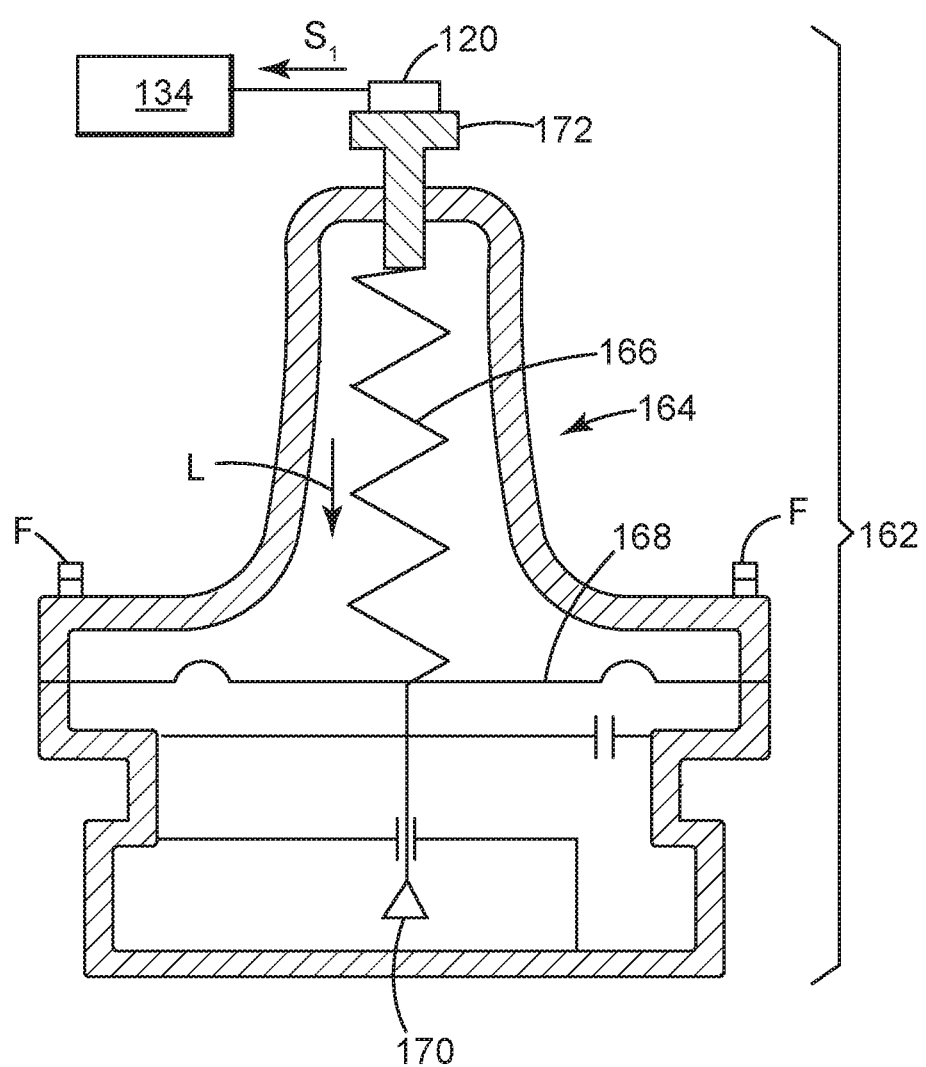
FIG. 4 depicts a schematic diagram of an elevation view of the cross-section of an example of a pressure regulator for use in the metering unit of FIG. 1.

FIG. 4 depicts a schematic diagram of an elevation view of the cross-section of an example of structure for the pressure regulator 106. This structure includes a housing 162, which may be split in two cast, thin-walled components that secure together with fasteners F. The top part of the housing 162 may include an elongate neck 164 to accommodate a spring 166 that generates load L onto a thin, metal or plastic plate 168 also known as the "diaphragm." The plate 168 may be disposed or sandwiched between the parts of the housing 162 at its periphery and couple with a valve 170. The load L sets pressure necessary for the plate 168 to move to change the valve 170 position to regulate flow through the device. The transition may occur, for example, due to changes in pressure downstream of the pressure regulator 106. The structure may also include an adjustment mechanism 172, like a screw, that penetrates out of the elongate neck 164 to provide manual adjustment of the spring load L. As shown, the sensor unit 120 may reside on the mechanism 172 so that the signal $S_1$ corresponds directly with movement of spring 166.

Figure 5:
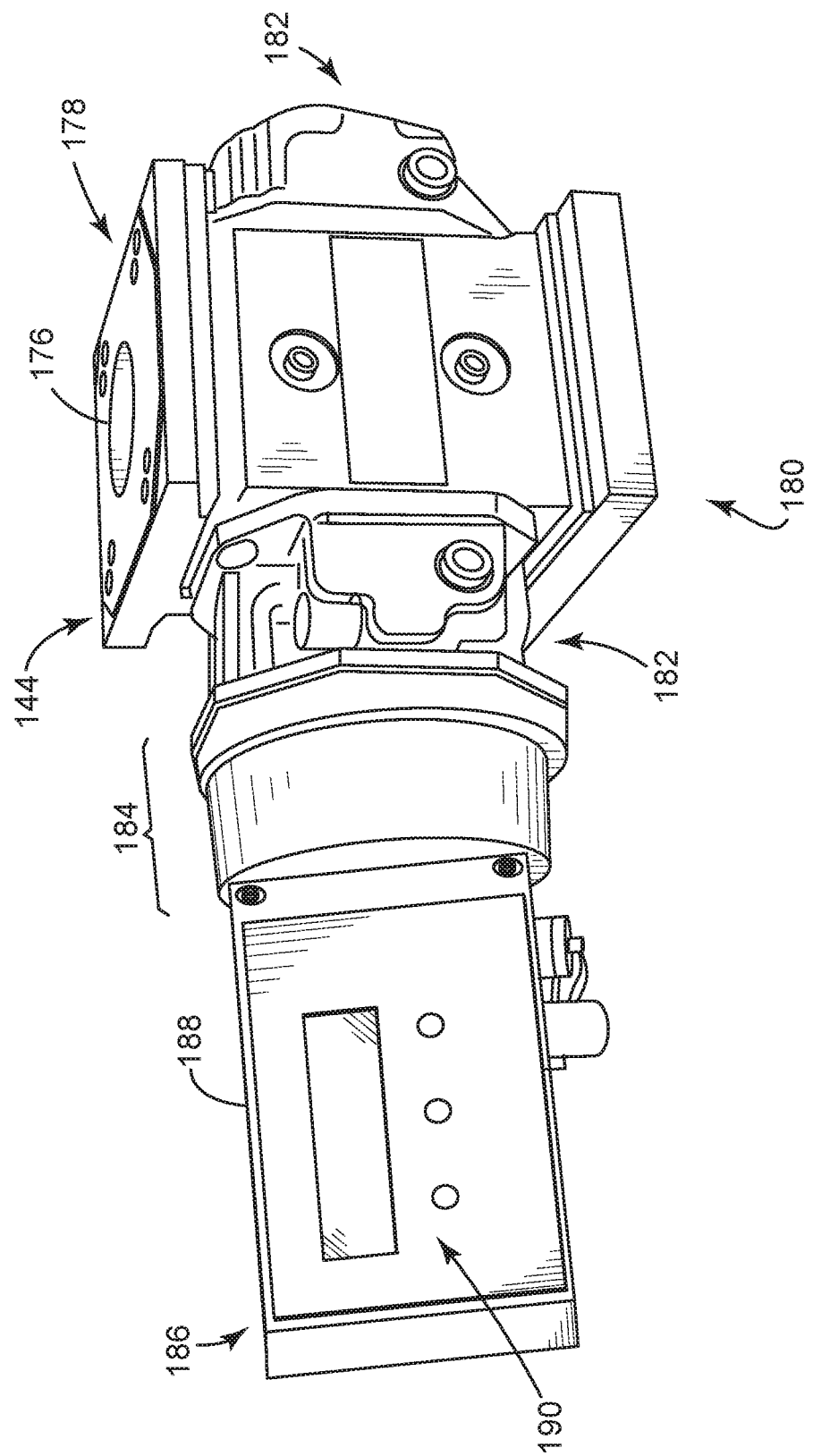
FIG. 5 depicts a schematic diagram of a perspective view of an example of a gas meter for use in the metering unit of FIG. 1.

FIG. 5 depicts a perspective view of exemplary structure for the gas meter 104. The structure may include a meter body 174, typically of cast or machined metals. The meter body 174 may form an internal pathway that terminates at openings 176 with flanged ends (e.g., a first flanged end 178 and a second flanged end 180). The ends 178, 180 may couple with complimentary features on a pipe or pipeline to locate the meter body 174 in-line with the branch line 116. As also shown, the meter body 174 may have covers 182 disposed on opposing sides of the device. The covers 182 may provide access to an interior cavity or "flowpath," where a pair of impellers resides inside so as to have access to the flow fuel gas (or other material 114) that passes through openings 176. Notably, the structure may accommodate other mechanics, like a diaphragm, or electronics for this purpose. One of the covers 182 may feature a connection 184, possibly flanged or prepared to interface with an electronics unit 186, shown here with an index housing 188 having an end that couples with the connection 186. The index housing 188 may comprise plastics, operating generally as an enclosure to contain and protect electronics to generate data for volumetric flow of fuel gas through the body 174. The index housing 188 may support a display 190 and user actionable devices, for example, one or more depressable keys an end user uses to interface with interior electronics to change the display 190 or other operative features of the device.

In light of the foregoing discussion, the embodiments herein improve diagnostics for pressure regulators in the field. These diagnostics provide accurate measures of duty cycle of diaphragms as relates to customer demand. Utilities can use these measures to schedule service to replace the diaphragm, essentially avoiding unnecessary trips to the field to replace diaphragms that have significant useable life left.

Topology for circuitry herein may leverage various hardware or electronic components. This hardware may employ substrates, preferably one or more printed circuit boards (PCB) with interconnects of varying designs, although flexible printed circuit boards, flexible circuits, ceramic-based substrates, and silicon-based substrates may also suffice. A collection of discrete electrical components may be disposed on the substrate, effectively forming circuits or circuitry to process and generate signals and data. Examples of discrete electrical components include transistors, resistors, and capacitors, as well as more complex analog and digital processing components (e.g., processors, storage memory, converters, etc.). This disclosure does not, however, foreclose use of solid-state devices and semiconductor devices, as well as full-function chips or chip-on-chip, chip-on-board, system-on chip, and like designs. Examples of a processor include microprocessors and other logic devices such as field programmable gate arrays ("FPGAs") and application specific integrated circuits ("ASICs"). Memory includes volatile and non-volatile memory and can store executable instructions in the form of and/or including software (or firmware) instructions and configuration settings. Although all of the discrete elements, circuits, and devices function individually in a manner that is generally understood by those artisans that have ordinary skill in the electrical arts, it is their combination and integration into functional electrical groups and circuits that generally provide for the concepts that are disclosed and described herein.

This written description uses examples to disclose the invention, including the best mode, and also to enable any person skilled in the art to practice the invention, including making and using any devices or systems and performing any incorporated methods. An element or function recited in the singular and proceeded with the word "a" or "an" should be understood as not excluding plural said elements or functions, unless such exclusion is explicitly recited. References to "one embodiment" of the claimed invention should not be interpreted as excluding the existence of additional embodiments that also incorporate the recited features. Furthermore, the claims are but some examples that define the patentable scope of the invention. This scope may include and contemplate other examples that occur to those skilled in the art. Such other examples are intended to be within the scope of the claims if they have structural elements that do not differ from the literal language of the claims, or if they include equivalent structural elements with insubstantial differences from the literal language of the claims.

Examples appear below that include certain elements or clauses one or more of which may be combined with other elements and clauses describe embodiments contemplated within the scope and spirit of this disclosure.

What is claimed is:

1. An apparatus, comprising:
a pressure regulator having a mechanism for regulating pressure of flowing fluid, the mechanism comprising a housing with a top, a diaphragm, and a spring disposed in the housing, the mechanism also comprising an adjustment screw that penetrates through the top of the housing, wherein the adjustment screw travels axially relative to deflection of the spring to change spring load of the spring on the diaphragm;
an accelerometer disposed on an exposed top end of the adjustment screw; and
a signal processor in communication with the accelerometer, the signal processor configured to convert an analog, time-based signal from the accelerometer that corresponds with deflection of the spring in response to movement of the diaphragm into a digital, frequency-based signal, wherein the signal processor has a filter with a filter band that removes parts of the signal not related to deflection of the spring in the pressure regulator and processes the signal to quantify an operating condition of the diaphragm in the pressure regulator.

2. The apparatus of claim 1, wherein the digital, frequency-based signal correlates with stroke of the spring.

3. The apparatus of claim 1, wherein the digital, frequency-based signal correlates with stroke frequency of the spring.

4. The apparatus of claim 1, wherein the digital, frequency-based signal correlates with an aggregate number of strokes of the spring over time.

5. The apparatus of claim 1, further comprising:
a filter having a filter band set so that the digital, frequency-based signal correlates with demand for flow downstream of the pressure regulator.

6. The apparatus of claim 1, further comprising:
a filter having a filter band set so that the digital, frequency-based signal correlates with demand for flow downstream of the pressure regulator; and
a wireless communication device coupled to the signal processor to transmit the digital, frequency-based signal.

7. The apparatus of claim 1, further comprising:
a filter having a filter band set so that the digital, frequency-based signal correlates with demand for flow downstream of the pressure regulator; and
a wireless communication device coupled to the signal processor to receive data that assigns the filter band.

* * * * *